United States Patent [19]

Gross

[11] 4,026,187

[45] May 31, 1977

[54] PLASTIC SCREW GROMMET

[75] Inventor: George E. Gross, Tinley Park, Ill.

[73] Assignee: Illinois Tool Works Inc., Chicago, Ill.

[22] Filed: Dec. 5, 1975

[21] Appl. No.: 638,219

[52] U.S. Cl. .................................. 85/72; 85/82; 85/84

[51] Int. Cl.² ........................................ F16B 13/08

[58] Field of Search ............ 85/72, 80, 81, 82, 83, 85/84, 85

[56] References Cited

UNITED STATES PATENTS

| | | | |
|---|---|---|---|
| 1,025,275 | 5/1912 | Kennedy | 85/84 |
| 2,348,589 | 5/1944 | Auten | 85/82 |
| 2,448,351 | 8/1948 | Brush | 85/84 |
| 2,788,047 | 4/1957 | Rapata | 85/80 |
| 3,393,599 | 7/1968 | Fisher | 85/84 X |
| 3,395,604 | 8/1968 | Williams | 85/82 |
| 3,513,509 | 5/1970 | Gross | 85/72 X |
| 3,618,443 | 11/1971 | Fitzner | 85/80 X |
| 3,765,295 | 10/1973 | Ptak | 85/83 X |
| 3,779,495 | 12/1973 | Richards | 85/84 X |
| 3,803,791 | 4/1974 | Turnbull et al. | 85/83 X |

FOREIGN PATENTS OR APPLICATIONS

| | | | |
|---|---|---|---|
| 29,870 | 10/1921 | Austria | 85/85 |
| 1,122,536 | 5/1956 | France | 85/84 |
| 918,504 | 10/1946 | France | 85/84 |
| 904,846 | 3/1945 | France | 85/84 |
| 472,423 | 3/1927 | Germany | 85/84 |
| 2,105,546 | 8/1971 | Germany | 85/82 |
| 314,077 | 5/1956 | Switzerland | 85/85 |
| 1,187,694 | 4/1970 | United Kingdom | 85/84 |

Primary Examiner—Marion Parsons, Jr.
Assistant Examiner—Thomas J. Holko
Attorney, Agent, or Firm—Jack R. Halvorsen; Robert W. Beart

[57] ABSTRACT

A one-piece split shank through bore plastic screw grommet for use in a round hole and which will not spin when a screw is introduced into the bore. In this fastener the size of the shank exceeds the hole to such a degree that when a drive pin having crushable ribs is driven into the bore to expand the shank there are sufficient forces exerted on the wall of the hole to prevent rotation of the screw grommet when the torque of the screw is imparted to the grommet as threads are formed in the bore by the screw.

13 Claims, 16 Drawing Figures

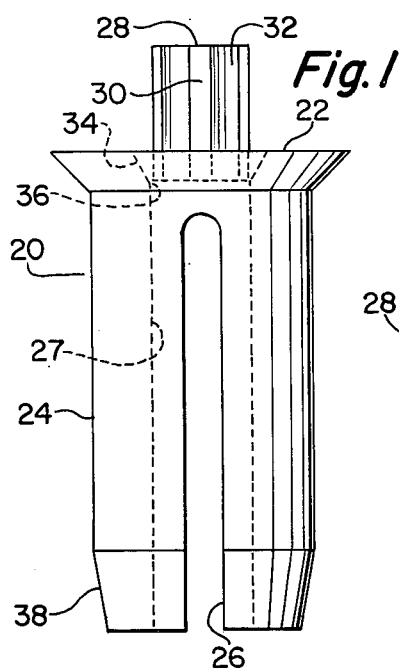
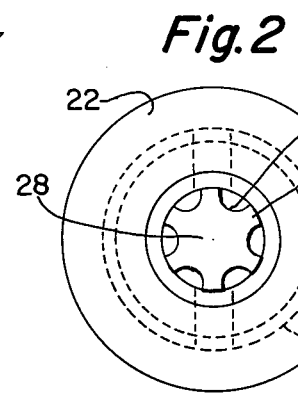
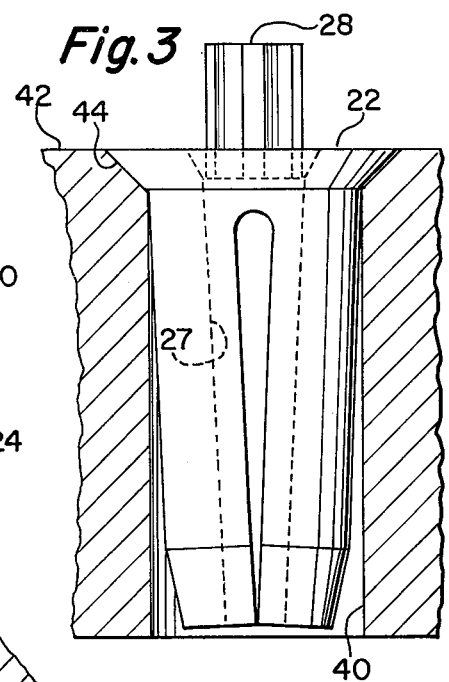
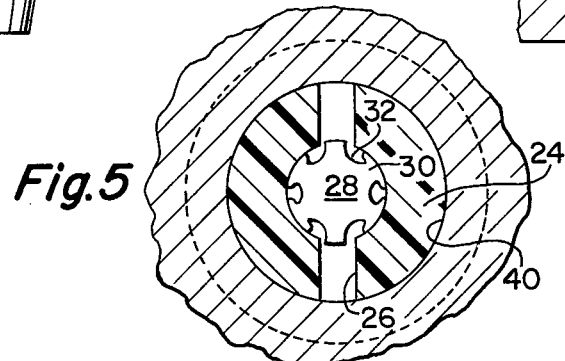
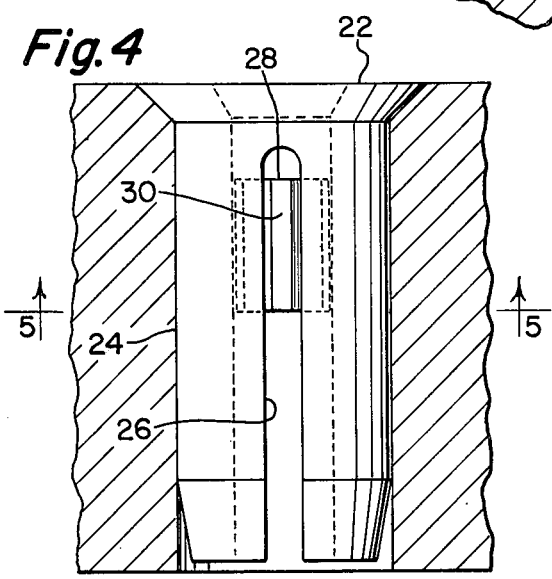
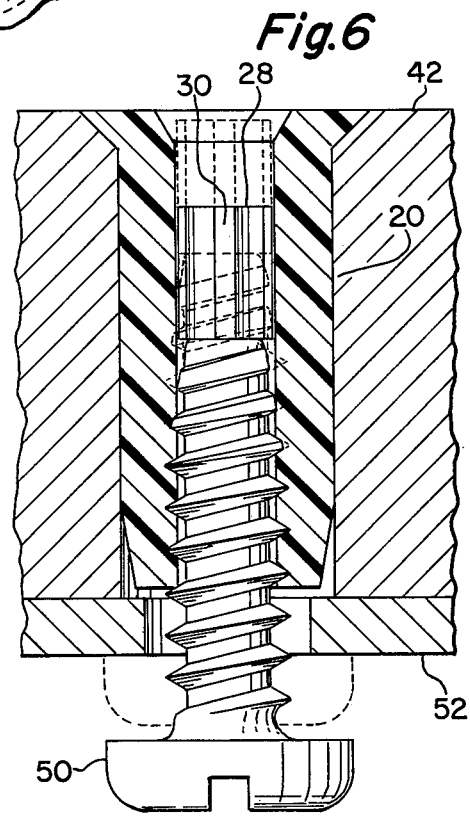

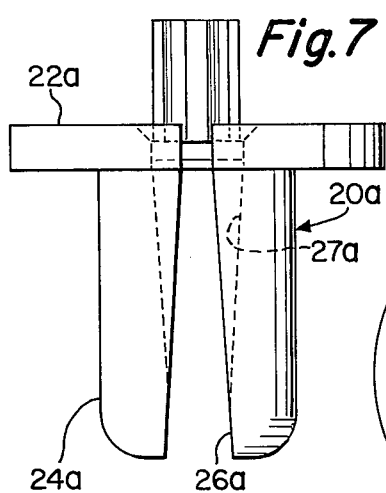
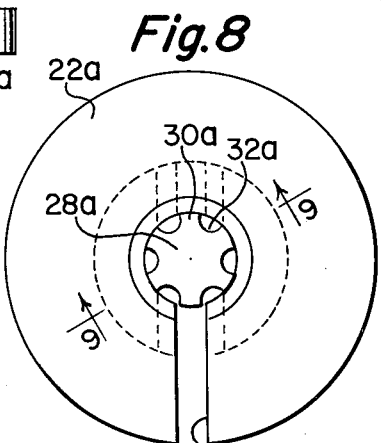
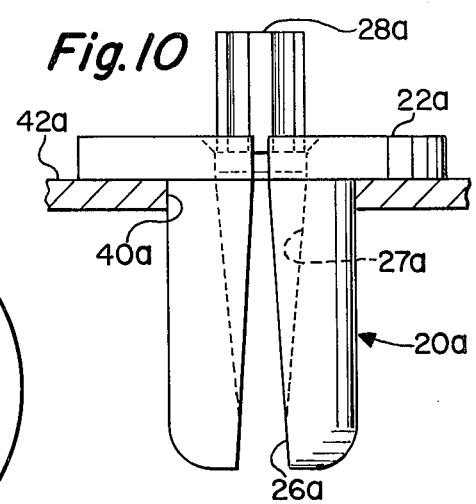
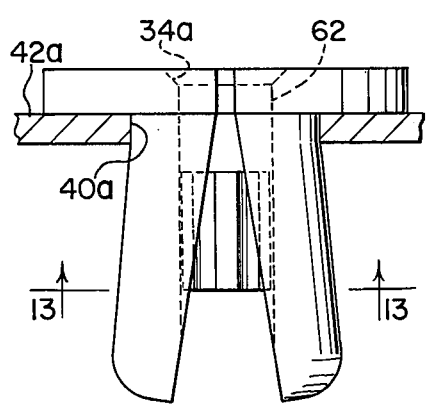
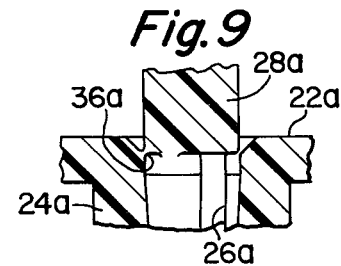
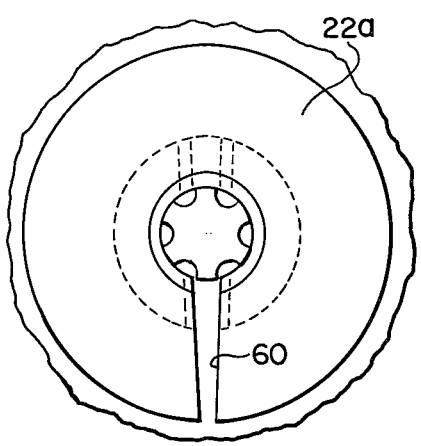
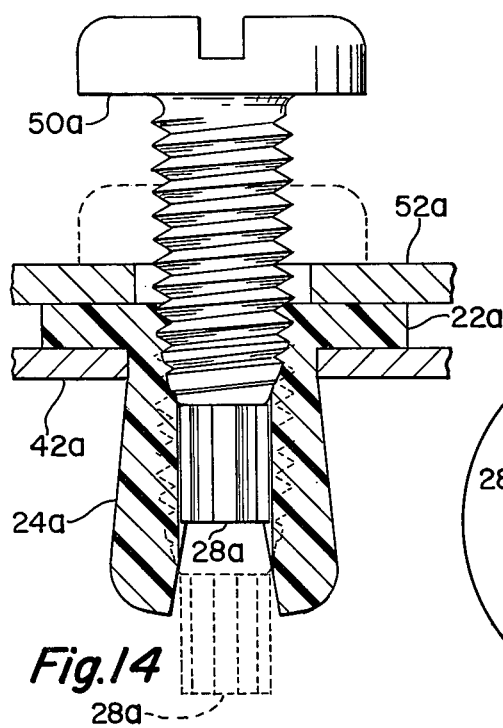
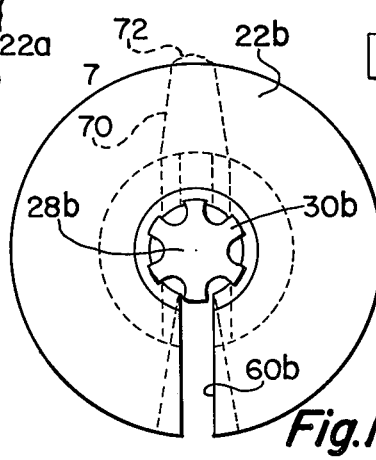
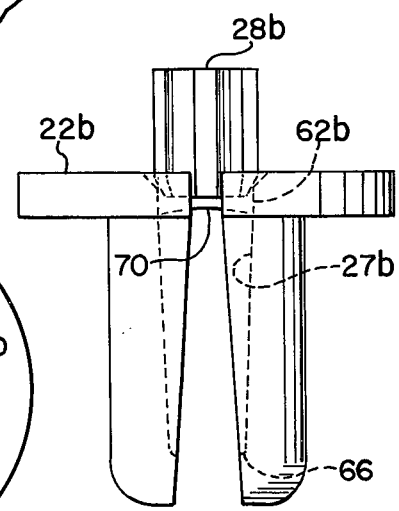

PLASTIC SCREW GROMMET

BACKGROUND OF THE INVENTION

This invention relates generally to fastening devices, and more particularly concerns screw-accepting anchors for joining workpieces.

Screw and nut devices are commonly used throughout industry to join parts. Standard threaded bolt and nut fasteners usually require two tools to effect the connecting operation; after the screw is inserted through one or more workpieces, an anchor nut member is turned on the screw shank. One tool then engages the nut, and a second tool engages either the screw shank or a screw head, usually located upon an opposite workpiece side, and tightening rotation between the nut and screw is provided by the two tools.

A number of successful attempts have been made to eliminate the need for the nut or anchor-engaging tool. In these fastening systems, the anchors are affixed to a surrounding workpiece in some manner before a screw is inserted into the anchor and screw tightening rotation is begun. In some such devices, the anchor member is glued or otherwise adhesively connected to the surrounding workpiece. Still others rely upon the geometry of the anchor member and the surrounding workpiece aperture to prevent rotation of the anchor in the workpiece as the screw is turned into the anchor. An example of such geometric relationship for preventing rotation is shown in Rapata U.S. Pat. No. 2,788,047 wherein his polygonal shaped shank section 14 engages the complimentary aperture 30. Devices having rotation preventing means in the form of a wrench engaging head is shown in U.S. Pat. No. 2,956,605. The device shown in this latter patent can be used either by restraining rotation through the head and rotating the screw or, alternatively, by restraining the screw and rotating the fastener by means of the head. In each instance, the device requires the secondary restraining means to permit its use in a round aperture.

It is a recognized fact that the cost of producing a polygonal aperture is more expensive in commercial production than to produce a round aperture. Additionally, if repairs or replacements are required in the field, the average serviceman is unable to produce a polygonal or square aperture since the most common tool available to him is a drill capable of producing a round hole. Thus, the need for a screw retaining means which is acceptable in a round hole and which will not spin when the screw is introduced into the bore thereof is well recognized. Further, to be commercially successful, fastening devices must minimize the number of parts and work operations required in a screw and anchor assembly operation. Thus, the need for adhesives, extra tools or parts is often considered a drawback. Moreover, inadvertent spinning of the anchor in the workpiece caused by improper application of assembly forces to the screw and anchor slows assembly operations or repairs and contributes to manufacturing and maintenance costs, since the operation must be started over again.

One such attempt at the solution of this problem was my previously issued U.S. Pat. No. 3,893,365 in which I provided a one-piece plastic screw anchor having the screw receiving bore formed parallel but offset from the axis of the shank. While this is an acceptable solution and provides a modicum of adjustability due to the off center relationship of the two axes, it does have drawbacks where it is desired to have a predetermined location for the screw axis and required a bit of adjustment for orientation to accept the screw through the secondary workpiece being supported and fastened.

SUMMARY OF THE INVENTION

It is thus an object of the present invention to provide a fastening device wherein rotation of an anchor member or screw grommet inserted in a workpiece aperture—even a round aperture—is prevented.

A more specific object is to provide a screw and anchor fastening device wherein anchor rotation is prevented without engaging the anchor by a fixing tool, without using adhesive, and without providing a geometrical configuration requiring a complimentary hole to restrain rotation of the anchor.

It is another object of the invention to provide an inexpensive, yet effective, screw and anchor fastening device which can be used to interconnect two or more workpieces and which can be installed quickly and assembled tightly without use of more than a screwdriving tool and a pin driving hammer. This is all accomplished through the provision of a one-piece split shank through bore screw grommet wherein the size of the skank exceeds the hole size to such a degree that when a drive pin having crushable ribs is driven into the bore to expand the shank there are sufficient forces exerted on the wall of the hole to prevent rotation of the screw grommet when the torque of the screw is imparted to the grommet as threads are formed in the bore by the screw.

Other objects and advantages of the invention will become apparent upon reading the following detailed description with reference to the drawings. Throughout the description like reference numerals refer to like parts with the addition of suffices for distinguishing the various embodiments.

BRIEF DESCRIPTION OF THE DRAWINGS

FIG. 1 is an elevational view showing the novel anchor member or nut contemplated by the present invention;

FIG. 2 is a plan view of the head end of the device shown in FIG. 1;

FIG. 3 is an elevational view in partial section showing the nut inserted into a workpiece aperture and before the drive pin with crushable ribs has been driven;

FIG. 4 is an elevational view in partial section of the device as shown in FIG. 3 wherein the drive pin has been driven into the shank;

FIG. 5 is a view taken along line 5—5 of FIG. 4 showing the crushing of the ribs of the drive pin;

FIG. 6 is an elevational view in partial section showing the introduction of a screw threaded member into the bore of the plastic nut;

FIG. 7 is an elevational view of a second embodiment of the present invention;

FIG. 8 is a plan view from the head end of the second embodiment of the present invention;

FIG. 9 is a partial sectional view taken along 9—9 of FIG. 8 showing the restricted area of engagement of the drive pin;

FIG. 10 is an elevational view in partial section of the second embodiment inserted in a workpiece aperture and showing the closing up of the slot which passes through the shank and one side of the head;

FIG. 11 is a plan view more clearly showing the closing up of the head slot;

FIG. 12 is an elevational view in partial section showing the drive pin in driven position;

FIG. 13 is a sectional view toward the head end taken along 13—13 in FIG. 12;

FIG. 14 is an elevational view in partial section showing the initial introduction of a screw into the bore of the second embodiment and in phantom showing its final seated position with the ejection of the drive pin;

FIG. 15 is a plan view of a third embodiment of the present invention; and

FIG. 16 is an elevational view of the third embodiment shown in FIG. 15.

DETAILED DESCRIPTION

While the invention will be described in connection with preferred embodiments, it will be understood that it is not intended to limit the invention to these specific embodiments. On the contrary, it is intended to cover all alternatives, modifications, and equivalents as may be included within the spirit and scope of the invention.

Referring now to FIGS. 1 through 6 there is shown one embodiment of the novel fastening device 20 which includes a head 22, in this embodiment a countersunk head for flush positioning within the workpiece, a shank 24 which is divided into two or more parts by an axially extending slot 26; a through bore 27 which extends throughout the length of shank 24 and passes through the head 22; and a drive pin 28 having a plurality of crushable ribs 30 circumferentially spaced about the pin 28 and providing a similar number of grooves 32. The bore 27 is provided with a countersink 34 at the head end, in this embodiment, and can be provided with a similar countersink or tapered entryway at the free end of the shank, if desired. Additionally, the exterior of the shank is tapered as at 38 to permit its entry into an undersized bore wherein the external diameter of shank 24 is slightly greater than the diameter of a bore 40 found in workpiece 42. In this embodiment, the bore 40 is countersunk as at 44 to permit flush mounting of the head 22. As can be best seen in FIG. 3, when the shank 24 is telescoped within bore 40 of the workpiece 42, the shank 24 collapses radially inwardly from its juncture with the head 22. This provides a tapering to the bore 28. An axial blow to the pin 28 forces the pin into the tapered bore, crushes the ribs 30 into the adjoining groove 32 and brings the smooth exterior surface of shank 24 into pressfit engagement with the wall of the bore 40. The size, crushability and accommodation of ribs 30 within the grooves 32, when taken in combination with the smooth external surface of shank 24 as well as the smooth internal surface of the bore 27, it is possible to insure a predetermined lateral force against the wall of bore 40. The crushing of the ribs is exemplified in FIG. 5 with the tight pressfit of the shank 24 against the walls of bore 40. In the present embodiment the pin 28 is substantially shorter than the axial length of bore 27 and when frangibly disconnected from its juncture with the head 22 is preferably driven to a position intermediate the extent of slotted shank 24. As seen in FIG. 4, the pin 28 should be driven at least past the terminal end of slot 26 to insure lateral flexing of the shank 24 into firm engagement with the wall of bore 40.

As seen in FIG. 6, a screw having a predetermined diameter is introduced into the free end of the nut 20, opposite the head, with at least the pitch diameter of said screw 50 being equal to or greater than the diameter of bore 27. As the screw is introduced, the presence of drive pin 28 insures the nonrotation or spinning of the nut 20 with the large diameter of the screw, relative to the diameter of the pin 28, forcing the nut 20 even more tightly against the walls of bore 40 and thereby insuring a lack of rotation. In this present embodiment, the length of the screw is controlled so as to come into contact with the pin 28 and to move it back into proximal relation to the head 22 but still captured within the bore 27. The screw 50 fastens a secondary workpiece 52 to the primary support 42.

Prior art devices, such as U.S. Pat. No. 3,385,157, disclose the use of external ribs in grooves for forming a shoulder on the shank of a fastener when it is used in a multiplicity of panel thicknesses. A similar device, wherein internal splines or ribs are provided, can be found in U.S. Pat. No. 3,205,760. The instant invention, however, utilizes a smooth exterior on the shank 24 to provide maximum engagement with the workpiece and a smooth bore 27 to insure maximum engagement between the threads of screw 50 and the nut. The instant device can be readily controlled as to the degree and force of engagement between the shank 24 and the walls of bore 40 in workpiece 42 by insuring a capability of tolerance variation acceptance through the crushing of ribs 30 into the grooves 32 with the ultimate being the complete collapse of rib 30 and filling of cavity or groove 32.

It is a feature of this invention that the anchor member or nut 20 can be inexpensively fabricated by injection molding from a resinous thermal plastic material, such as those sold under the trademark "NYLON", "DELRIN" and "NORYL". While the screw, in this particular embodiment, is introduced through the free end of shank 24, it will be appreciated that it could equally well be inserted through the head 22, the direction of insertion being a matter of choice as to which side of the workpiece the secondary member 52 is to be applied.

Referring now to FIGS. 7 through 14, wherein similar numerals are used to refer to similar parts with the addition of the suffix a, this embodiment includes a fastener or nut 20a having a smooth straight shank 24a, a head 22a, in this embodiment generally cylindrical, and a tapered slot 26a with slot 26a converging towards the head and extending through the head in the form of a radial slot 60 having a width substantially equal to the dimension of slot 26a at its upper extremity, as viewed in the drawings. The bore 27a is tapered in a reverse direction to slot 26a with its maximum dimension internally of the head and blending into slot 26a at its opposite extremity. The drive pin 28a is fluted with ribs 30a and grooves 32a, but in this embodiment the pin is provided with a frangible section 36 which extends less than completely around the circumference of pin 28a. One form would include the frangible sections 36a extending only between the limits of line 9—9, as seen in FIG. 8 and as illustrated in FIG. 9, whereby the head 22a and its slot 60 therethrough permits circumferential collapse of the head along with permissable movement of the shank portions 24a.

As can be best seen in FIG. 10, when the fastener 20a is inserted into aperture 40a in workpiece 42a, with aperture 40a having a diametrical extent lesser than the diameter of shank 24a, the slotted shank 24a collapses radially inwardly while the slot 60 is circumferentially closed. This can be best seen in FIGS. 10 and 11.

In this embodiment, a predetermined blow will sever the frangible section 36a and drive the pin 28a a limited extent into the bore 27a. The tapered bore 27a, when contacted by the crushable ribs 30a of pin 28a, insures a large radial expansion of the shank portions 24a to exert a predetermined force against the wall of aperture 40a and the undersurface of panel 42a opposite that surface contacted by head 22a. Here again, the pin 28a has a length substantially less than the axial extent of bore 27a. The head 22a, in this embodiment, has a cylindrical bore portion 62 adjacent the tapered lead-in 34a which insures co-axial delivery of the pin 28a into the tapered bore 27a. The ribs 30a are crushed to a predetermined extent, as seen in FIG. 13, to insure that adequate force is exerted against the walls of bore 40a in workpiece 42a when a screw 50a is inserted from the head end, as best seen in FIG. 14, for the purpose of securing a secondary workpiece 52a relative to the primary support workpiece 42a. In this embodiment, the screw has a diameter sufficient to insure maximum forming of threads within the bore 27a and to provide adequate lateral forces against the split shank 24a, as it engages the walls of aperture 40a, even when the screw, as shown in phantom, has pushed the pin 28a out through the free end of the bore 27a. This device, like the previous one, can be injection molded in one piece from suitable resinous materials.

Referring now to FIGS. 15 and 16, a third embodiment of the present invention is shown wherein similar parts are designated by similar numerals with the addition of the suffix b. In this embodiment, the general configuration is substantially identical to the second embodiment in that it is provided with a slot 60b in the head 22b, a fluted drive pin 28b similar to the previous embodiments but distinguished by the fact that it is provided with ribs 30b which are greater in radial extent than the diameter of the tapered bore 27b and more particularly, it is greater in size than the cylindrical portion of the bore 62b in the head 22b. This added material in the ribs 30b is for the purpose of insuring greater lateral forces over a wide tolerance variation in aperture diameter. For example, if an operator mistakenly selects an oversize drill to prepare the aperture in the workpiece, the oversize pin ribs will expand the prongs to a point where they will aggressively grip the panel and accept a screw without rotating. In this instance, the split head slot 60b will open to a position overemphasized by the angularly disposed phantom lines in FIG. 15. To insure the flexibility of the head, the portion of the head opposite the slot is thinned, as indicated by the numeral 70, with the thinned portion 70 being capable of flexing, as indicated in phantom by the numeral 72 in FIG. 15, as the slot 60b is opened to accommodate the oversized pin 30b when the anchor nut is used in an oversize hole.

This embodiment also provides, at the free end of the bore 27b, a pair of stops 66 which insure that the pin 28b is not overdriven when it is telescoped within the bore 27b.

With respect to the embodiment shown in FIGS. 2 through 6, it has been found that this part can be used in a 0.281 diameter hole with the diameter of the shank being within the limits of 0.293 to 0.298 and the 0.135 diameter bore accepting a number eight thread cutting screw for repeated accuracy in useage without spinning. For the anchor nut shown in FIGS. 7 through 14, it has been found that this part, having a diameter within the tolerances of 0.255 to 0.260 inches, will be accepted within a 0.250 diameter hole in a 0.035 to 0.037 inches thick panel and with a bore at the head end having a 0.120 diameter be used successfully with a number 10-32 screw. The embodiment of FIGS. 15 and 16 can be successfully used either in larger hole sizes than the latter ones mentioned or can accommodate larger screw sizes and still be operable.

While variations in size of panel aperture and thickness, as well as diameters of bores or apertures will be appropriate, these variations, when used with appropriately sized anchor nuts, are not intended to be outside of the scope of the present invention.

I claim:

1. A one-piece plastic nut in combination with an apertured workpiece, said aperture being circular and having a predetermined diameter and a screw having a predetermined diameter through a substantial portion of its predetermined length, said nut including a head portion, a shank portion extending from said head having a diameter greater than said predetermined diameter of said workpiece aperture and having at least one slot therethrough to permit radial deformation of the shank portion during insertion in said workpiece aperture, said slot in the shank portion extends throughout substantially the entire length of said shank portion, the head and shank portions including a through bore having a predetermined diameter extending between opposite ends of said nut, said bore and the exterior surface of said shank being smooth, a drive pin having a length substantially less than said nut and acceptable within said bore, said pin having crushable means carried thereon, said crushable means on said drive pin including a plurality of circumferentially spaced axially extending flutes forming crushable ribs with the outer edges of said ribs lying on an imaginary cylinder equal to or larger than said through bore in said head, said shank elements being deflected inwardly upon insertion into said workpiece aperture to form a tapered bore substantially less in size than said fluted pin, said pin and its crushable ribs being sized for expanding said shank portion a predetermined amount against the walls of said workpiece aperture into a pressfit condition having a force against said aperture wall which is capable of resisting rotation of said nut and exceeds the torque forces applied thereto when said screw is introduced into said through bore and forms its threads in the wall of said bore, said shank portion having a predetermined wall thickness which is substantially rigid relative to the predetermined circumferential thickness of said ribs thereby producing the controlled crushing of said ribs when the pin is driven into said bore.

2. A nut of the type claimed in claim 1 wherein said shank portion exterior and said bore initially are cylindrical in configuration.

3. A nut of the type claimed in claim 1 wherein said head is frusto-concial in configuration and acceptable within a countersink in said workpiece so that the top of said head is flush with one surface of said workpiece.

4. A nut of the type claimed in claim 1 wherein said shank portion is bifurcated to form two shank elements, said slot being smaller in width than said through bore.

5. A nut of the type claimed in claim 1 wherein said drive pin is substantially less in length than the length of the through bore and has one end spaced from the entering end oposite the head to permit a thread forming screw to be introduced into said entering end.

6. A nut of the type claimed in claim 5 wherein said screw will axially move said pin when it is introduced into said bore and said screw having a predetermined diameter relative to the bore in said shank portion and capable of expanding said shank element laterally into a greater nonrotatable pressfit within the workpiece hole than created by said pin.

7. A nut of the type claimed in claim 6 wherein the combined length of said predetermined length of said screw and said pin is equal to or less than the total length of said through bore, said pin being initially driven to a position where its ends are spaced from said entering and head ends of said bore and intermediate the extremities of said slot.

8. A nut of the type claimed in claim 7 wherein said drive pin is initially frangibly connected to the head in axial alignment with said through bore, said pin at its point of connection having a diameter substantially equal to said through bore.

9. A nut of the type claimed in claim 1 wherein said through bore is tapered in said shank portion.

10. A nut of the type claimed in claim 9 wherein said slot is divergingly tapered in width from said head to the opposite entering end.

11. A nut of the type claimed in claim 10 wherein said tapered bore impressed in said shank elements terminates short of said entering end with a small indentation to stop the axial motion of said pin during assembly, said screw having a larger diameter than said pin and causing greater expansion of said shank elements thereby releasing said pin from said indentation and permitting said screw to push said pin out the entering end.

12. A nut of the type claimed in claim 10 wherein said head includes a radially disposed slot aligned with said shank slot and communicating with said bore to permit greater flexibility during insertion in the workpiece hole.

13. A nut of the type claimed in claim 12 wherein said head has a relieved portion generally radially opposite said head slot which increases the flexibility of said head when said head slot is circumferentially expanded.

* * * * *